(12) United States Patent
Ng et al.

(10) Patent No.: US 6,747,825 B1
(45) Date of Patent: Jun. 8, 2004

(54) DISC DRIVE WITH FAKE DEFECT ENTRIES

(75) Inventors: Wei Loon Ng, Singapore (SG); Beng Wee Quak, Singapore (SG); YongPeng Chng, Singapore (SG); Wesley Wing Hung Chan, Singapore (SG); Patrick Tai Heng Wong, Singapore (SG)

(73) Assignee: JPMorgan Chase Bank, as Collateral Agent, New York, NY (US)

( * ) Notice: Subject to any disclaimer, the term of this patent is extended or adjusted under 35 U.S.C. 154(b) by 0 days.

(21) Appl. No.: 09/578,235

(22) Filed: May 24, 2000

Related U.S. Application Data

(60) Provisional application No. 60/151,202, filed on Aug. 27, 1999.

(51) Int. Cl.[7] .................................................. G11B 5/09
(52) U.S. Cl. .............................. 360/48; 360/31; 360/53
(58) Field of Search ................................. 360/48, 31, 53

(56) References Cited

U.S. PATENT DOCUMENTS

| | | | |
|---|---|---|---|
| 4,935,825 A | 6/1990 | Worrell et al. ................. 360/54 |
| 5,740,358 A | 4/1998 | Geldman et al. ......... 395/184.01 |
| 5,841,748 A | 11/1998 | Yamamuro .................... 369/58 |
| 5,859,823 A | 1/1999 | Yamamuro .................... 369/58 |
| 5,883,867 A | 3/1999 | Yamamuro .................... 369/54 |
| 5,983,309 A | * 11/1999 | Atsatt et al. ..................... 711/4 |
| 2001/0032292 A1 | * 10/2001 | Hoskins et al. ............. 711/112 |
| 2001/0042223 A1 | * 11/2001 | Hoskins .......................... 714/8 |

* cited by examiner

*Primary Examiner*—David Hudspeth
*Assistant Examiner*—Dan I. Davidson

(57) ABSTRACT

A disc drive includes a base and a disc rotatably attached to the base. The disc drive is formatted by obtaining a list of defective sector entries, determining a first location of selected information based on skipping the defective sectors within the list of defective sector entries, and calculating a second location for selected information. At least one sector to skip is added before the second location of selected information to move the selected information from the first position to the second position. The added sectors may be designated as defective sectors. By adding the at least one sector to skip, the second position of the information is moved or slipped.

19 Claims, 6 Drawing Sheets

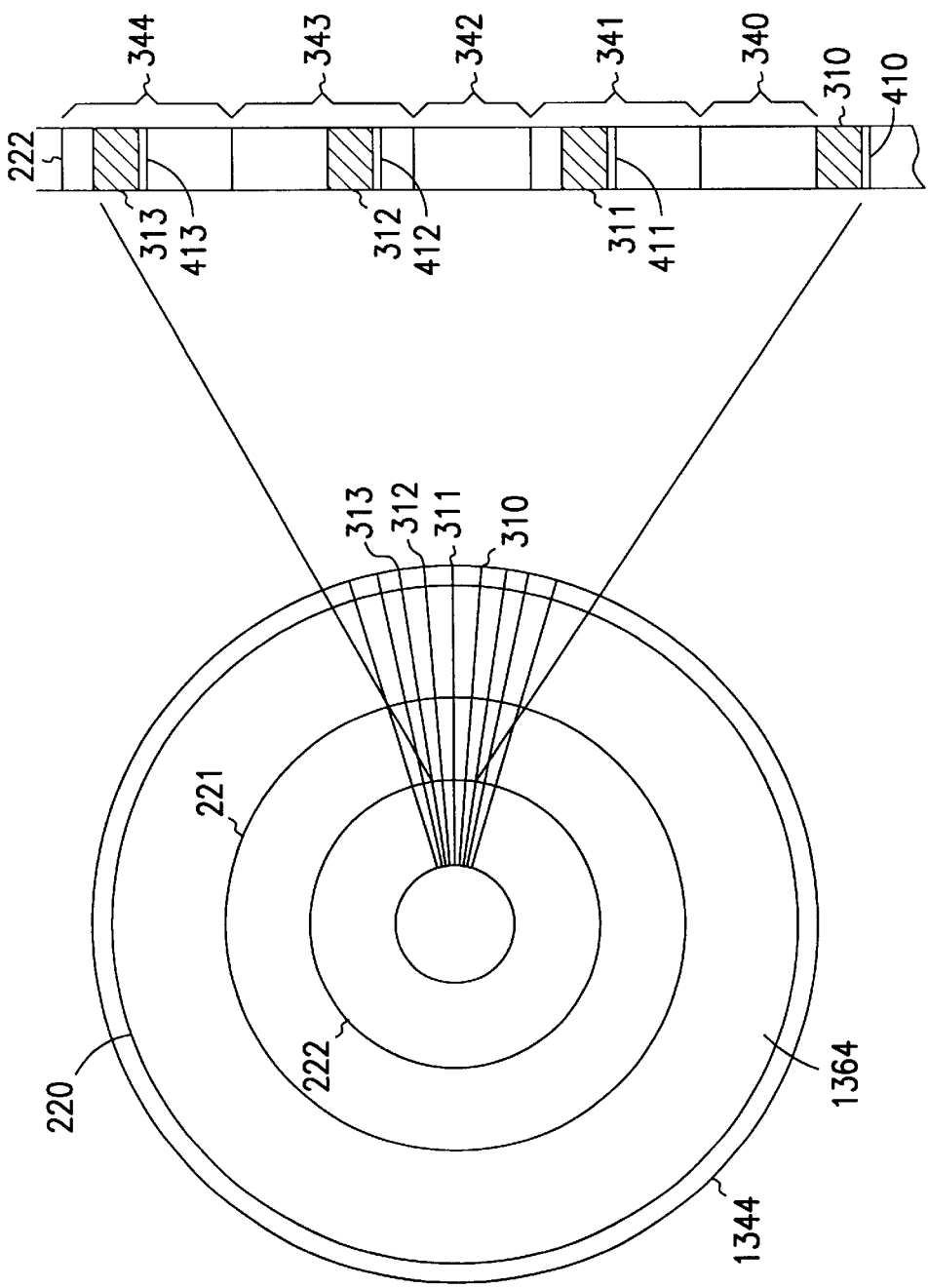

DISC DRIVE WITH FAKE DEFECT ENTRIES

RELATED APPLICATION

This application claims the benefit of U.S. Provisional Application Serial No. 60/151,202, filed Aug. 27, 1999 under 35 U.S.C. 119(e).

FIELD OF THE INVENTION

The present invention relates to the field of mass storage devices. More particularly, this invention relates to an apparatus and method for passing over, or more specifically slipping, defective sectors on disc surfaces within a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

In a disc drive having more than one surface on which to record data, the tracks at substantially the same radial distance from the center of the disc or discs are said to be in a cylinder. The cylinder is one unit of storage which includes several tracks. Each these cylinders and each track on a disc surface in a disc drive is further divided into a number of short arcs called sectors. The sector typically holds 512 bytes of information representing data. The number of sectors on a track used to be fixed wherever the track was located on the disc surface. Now, the number of sectors held on a track or within a cylinder varies depending on the zone which the track or cylinder is in. Typically, more sectors will be stored on the tracks and in the cylinders at the outer diameter which are in the zone toward the outer diameter of the disc.

Each sector in a disc drive is individually addressable. In order to locate the data, each sector is given a unique address, known as the physical cylinder, physical head and physical sector number. Some term this as the physical cylinder, head and sector (PCHS). Given these three parameters, the location of any sector can be determined.

When a disc is manufactured, there is a possibility that there may be defects on the disc. The defects typically can result in sectors or tracks that have doubtful, dangerous, or damaged magnetic media, which would otherwise put the customer's data at risk. These defects are to be avoided so that information representative of data is not written to a location where the data could be lost. Typically, each disc surface is checked for defects at the time of manufacture. A sector is considered defective if a number of retries must be used to recover the data on the sector. A sector is also considered defective if data written to the sector is not recoverable. The sectors occupying these locations are named as defects. These defects cannot be used for data storage and hence cannot be presented to the host computer for access.

Of course, avoiding the defective sectors can be done in any of a number of ways but each way requires keeping the defect in memory. In most disc drives, the defect management system has adopted a method of sector address translation, which simplifies the tasks of a host computer by offloading the tasks to the controller of a disc drive. The drive presents to a host computer, a collection of good sectors known as the logical block address (LBAs). Based on a known list of defects, the firmware of the disc drive translates the LBA to a physical cylinder, head and sector location (PCHS). While accessing the physical sector address in the sequential order, the defective sectors are skipped over. Therefore, every LBA is mapped to a unique physical cylinder, head and sector (PCHS) in the disc drive. Data files and program files are typically much larger than the number of bytes allocated to a sector. As a result, data and program files are divided and stored on disc drives as a number of LBAs. The actual methods of doing this are unique to every operating system. Before the disc drive can be used for this purpose, the operating system formats the disc drive by creating a lookup table of its own to map the data and program files to every LBA in the disc drive.

Every operating system employs a unique look up table method to locate data and program files in a disc drive. While the location of data and program files in the disc drives can change the location of these lookup tables are fixed during the formatting of the disc drive and will not change until the disc drive is reformatted again.

A typical data or file access requires the operating system to read the LBA containing the directory of filenames. The directory of filenames is read to determine if the file is available on the particular disc drive. If the file is found in the directory, the directory is read and contains information regarding the beginning 25A of the file. Another table, referred to as the file allocation table (FAT) includes the information. If the file that describes the location of the entire file. Finally, the disc drive proceeds to read the requested file into the memory. This can be summarized below:

1. End user request to read a data file.
2. Operating system search for the file in its director.
3. When file is found, operating system reads a file-allocation table describing all the LBA and order of the LBA which make up the data file.
4. Operating system finally proceeds to read the data file for the user.

In order to complete each read command to read data, both the directory and the file allocation tables are read. Of course, the majority of the time the data stored on a disc drive is read. Therefore, the majority of the time the disc drive is "working" it is executing read commands. As a result, any time that can be saved in reading the directory and in reading the file allocation tables will greatly enhance the performance of the disc drive.

Since every LBA maps to a unique physical cylinder, head and sector (PCHS), it is possible to predict the PCHS location of the LBAs in directory and the PCHS location of the LBAs in the file allocation table when the user formats the disc drive. Depending on the defective sectors in the disc drive, the PCHS locations may change from disc drive to disc drive. Defective sectors can occur anywhere on the disc surface. One method or scheme for handling defects is called defect slipping. This scheme of handling defects is generally used at the time of manufacture of the disc drive. In essence, when a defective sector is located, the defective sector is skipped and the next LBA is written to the next available good physical sector location. Defect slipping skips over defective sectors and keeps the locations of the defects in a large table. Each time a defective sector is skipped, the physical cylinder, head, sector (PCHS) address is offset from the logical block address (LBA). If a large number of defects are found, a large number of defective sectors are skipped resulting in a large offset between the PCHS and the LBA.

Some operating systems require that two copies of the file allocation table be written to disc for back up purposes. If one file allocation table is damaged, it can be reconstructed from a mirror copy. Of course keeping a mirror requires that upon completion of each write command, both file allocation tables are updated. The number of defective sectors located in the physical sectors between the first file allocation table and the second file allocation table determines the number of sectors which are slipped before the second file allocation table. Of course, the effect of slipping sectors is that the actual physical location of a particular sector may be slipped down a track, to another track within a cylinder, or to another cylinder. To determine the PCHS, an estimate is usually made by applying a formula to the LBA. Generally, the estimate presumes that no defective sectors have been found. The estimate selects the head and track as if no defective sectors are found. In other words, it is presumed no offset or that no sectors have been slipped. In the event a large number of defective sectors have been found, there are cases where the estimate may be offset by one or more tracks or cylinders. The algorithm essentially is to make an estimate ignoring any slipped sectors which corresponds to a location before the actual PCHS if there are any slipped sectors. The number of slipped sectors and the effect that they have on location is sometimes referred to as an offset. The number of defective sectors found determines the size of the offset.

The offset may cause problems if the PCHS of logical block address in the second file allocation table is radially positioned so that the rotation of the discs during a seek between the first file allocation table to the second file allocation results in just missing the corresponding LBA in the second file allocation table. This lengthens the process of updating the first and second file allocation tables since an additional rotation must be made in order to update an LBA in the second file allocation table. Some term the condition of having the corresponding addresses in the two allocation tables missing due to the rotation of the disc during a seek as being "out of alignment". In essence, after reading the information in one table, in the time necessary to seek to the second table the PCHS of the LBA in the second table is just missed. Repeated disk accesses and "out-of-alignment" LBA reads will eventually lead to lower disc drive performance. Access times will suffer. When an "out-of-alignment" offset case is produced in the file allocation table, performance degradation is accelerated since the file allocation table must be accessed for each read command.

What is needed is a method and apparatus for managing the spacing between the first file allocation table and the second file allocation table so that a seek between corresponding LBA does not result in a near miss. This is needed to reduce access times caused by slipped sector offsets in the directory and the file allocation table of the disc drive. There is also a need for a system and method to reliably access the directory and the file allocation table during the execution of read commands. There is still a further need for a system and method for allowing quicker updates of the first table and the second table after executing a write command.

SUMMARY OF THE INVENTION

A method for formatting a plurality of sectors to a storage surface on a disc in a disc drive includes reading information from a first location for storage of a first logical block address on a disc to determine a second location on the disc and determining a second physical location, spaced from the first location. The method also includes formatting the disc surface by providing a selected number of fake defective sectors before the second physical location. The added fake sectors cause the radial position of the second physical location to slip with respect to the first location. Slipping the radial position of the second physical location helps during a seek. The second location is slipped just enough so that during a seek from the first physical location to the second physical location, a transducer for reading or writing to the second location arrives just in time to read or write to the second location. The first location may include a directory of files on the disc drive or a file allocation table. The second location generally includes a file allocation table.

To format the disc drive, a list of defective sector entries is obtained, and a first location of selected information is determined based on the skipped defective sectors of defective sector entry list. A second location for selected information is calculated and at least one sector to the number of sectors to skip to move the selected information from the first position to the second position. Adding the sector includes designating at least one good sector as a defective sectors. In other words, adding at least one sector to skip to move the selected information from the first position to the second position includes designating good sectors as defective sectors. Calculation of the second location includes equating the second location for the selected information to a target position for a seek operation, and selecting a start position for the seek operation. The start position for the seek operation is typically from a sector on the disc which stores critical information, such as from a sector on the disc which stores a directory of files located on a disc drive or from a file allocation table. The start position for the seek operation is selected from a sector on the disc having information used by the operating system of a computer. Information used by the operating system of the computer is also stored at the target position.

Advantageously, the disc drive which uses the above inventions reduces the access times caused by offsets from slipped sectors in the directory and the file allocation table on the disc drive. The invention also provides for quick, reliable access to both the directory and the file allocation table during the execution of read commands. This prevents performance degradation since the access time is kept to a minimum. Using the invention, the access time to LBAs in the directory or the file allocation table is kept to a minimum since the estimated PCHS for the LBAs in these two critical areas are offset very little, if any, from the estimated PCHS. The invention is also flexible enough to handle different requirements from different operating systems used.

BRIEF DESCRIPTION OF THE DRAWINGS

FIG. 3 is a schematic representation of one of the tracks from the cylinder from the disc pack shown in FIG. 2.

FIG. 4 is a schematic representation of a portion of the track shown in FIG. 3. which includes a track identification field, sectors for storing information representative of data, and servo information.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
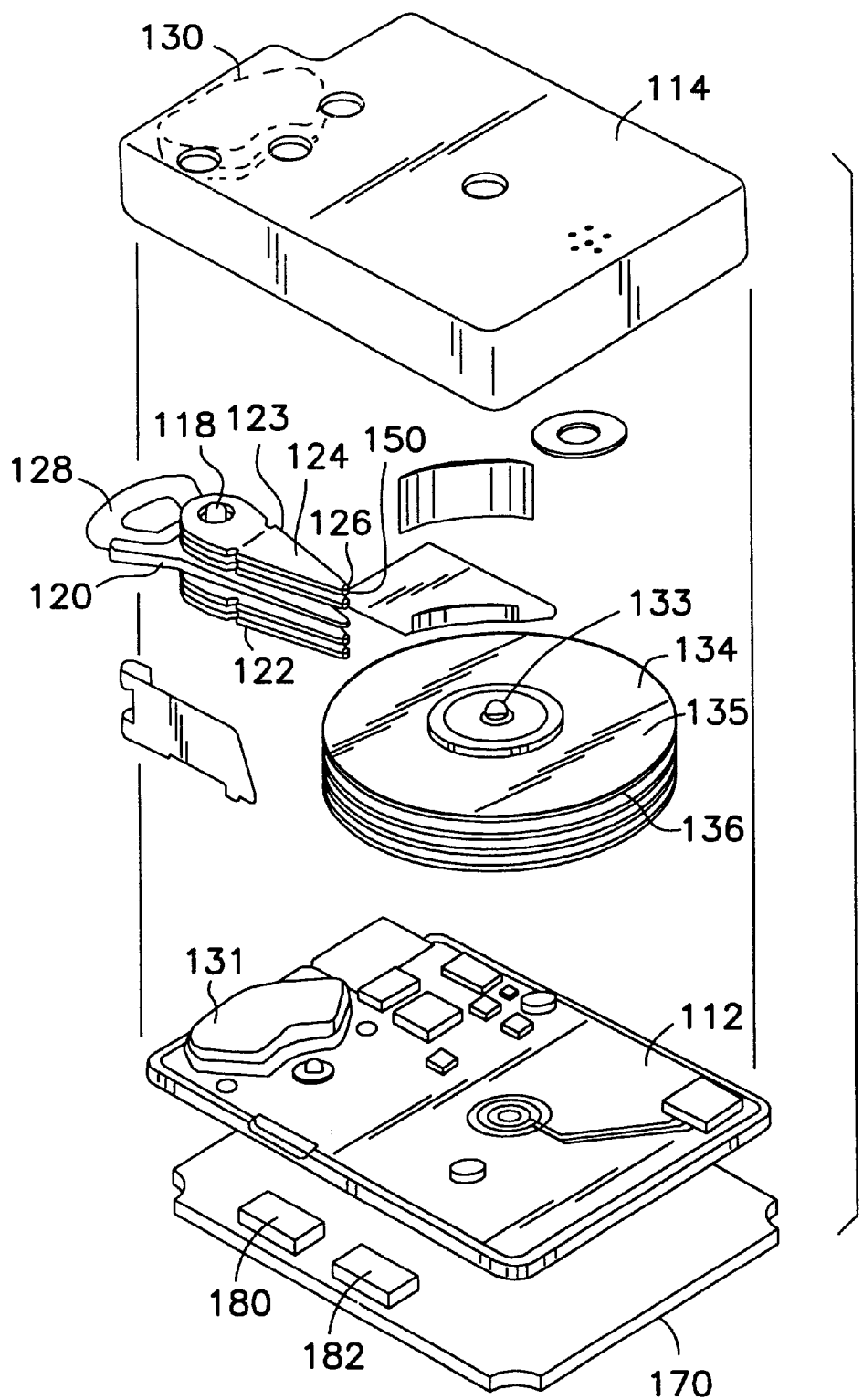
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. Each of the discs 134 has a first recording surface 135 and a second recording surface 136. Only one disc 134 is numbered for the sake of clarity. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub. The disc drive also includes a printed circuit card 170 which is attached to the base 112 of the disc drive 100. The printed circuit card 170 includes a controller 180 and random access memory 182 which the controlled accesses to control various aspects of the disc drive. The aspect of the disc drive controlled of interest is the control of the interface between a host computer and the disc drive and more specifically, the control of mapping logical block addresses to physical sector locations on a particular disc 134.

Figure 2:
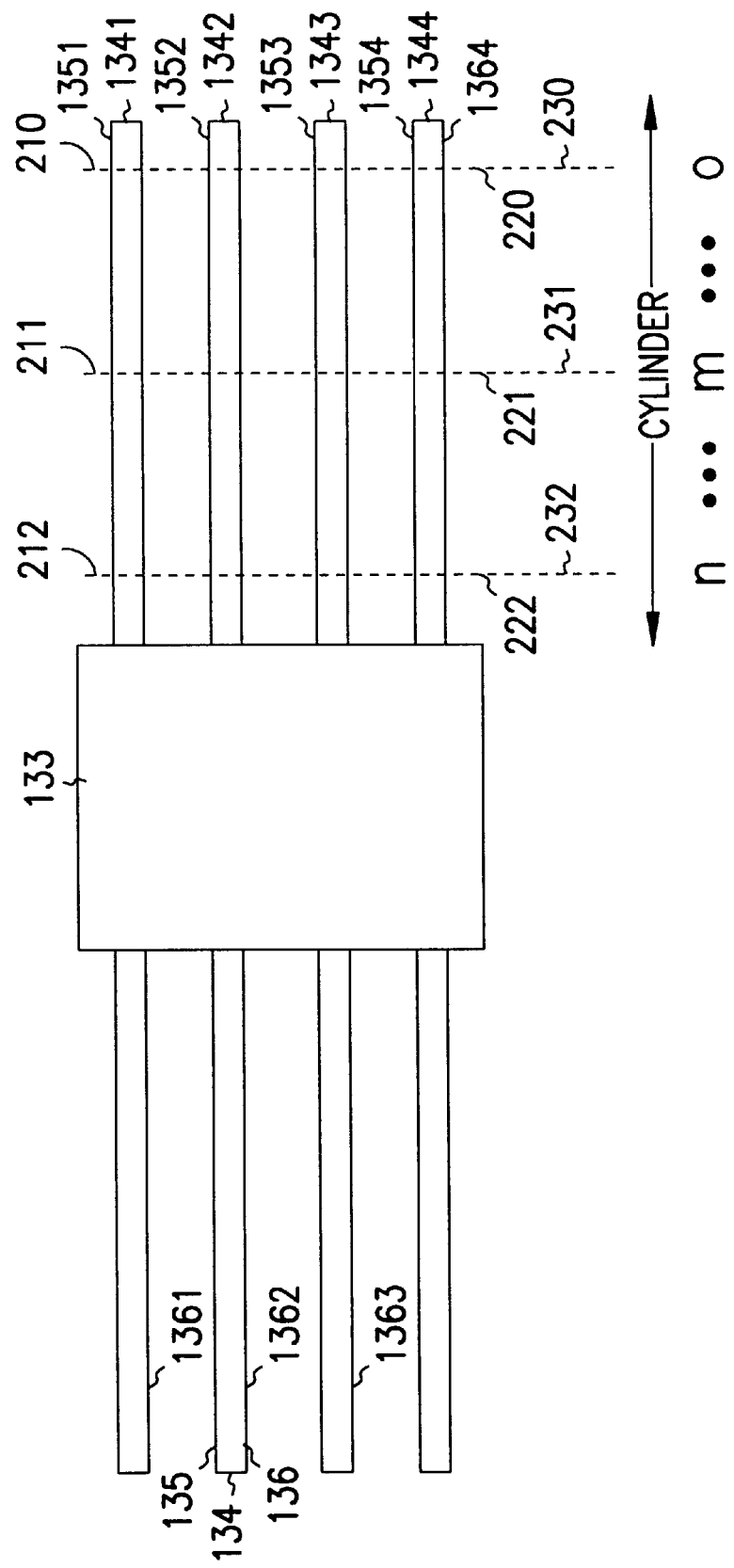
FIG. 2 is a cutaway schematic representation of the discs of a disc drive showing a set of tracks within a cylinder.

FIG. 2 is a cutaway schematic representation of the discs 134 of the disc drive 100. As shown in FIG. 2, each of the discs 134 has a first recording surface 135 and a second recording surface 136. Each of the discs is also attached to the spindle hub 133. In FIG. 2, each of the discs 134 is individual numbered as 1341, 1342, 1343, and 1344. Each disc also has a first recording surface 1351, 1352, 1353, 1354 and a second recording surface 1361, 1362, 1363, 1364. Information representing data is stored along a track on a recording surface of a disc. As shown in FIG. 2, there are three tracks 210, 211, and 212 on recording surface 1351 of disc 1341. The tracks occur on each of the disc surfaces 1351, 1352, 1353, 1354, 1361, 1362, 1363, 1364 and are shown as tick marks on each of the disc surfaces. Similar tracks are shown as tracks 220, 221 and 222 on surface 1364 of disc 1344. Generally, modern-day disc drives have many more than three tracks on a disc. For example, certain disc drives may have more than 4,000 tracks on a 3.5 inch disc platter. The tracks shown 210, 211, 212, 220, 221 and 222 show sets of tracks which are at the outer diameter 210, 220 and a set of track that represent tracks at the inner diameter 212 and 222, and a set of tracks at an intermediate diameter 211 and 221. FIG. 2 illustrates that each of the discs 1341, 1342, 1343 and 1344 have a first and a second recording surface. Each of the recording surfaces has a set of tracks thereon. Therefore, tracks are found on a particular recording surface. FIG. 2 also illustrates the concept of cylinders. A cylinder is a set of tracks that are at substantially the same radial distance away from the center of a set of discs. For example, tracks 212 and 222 and all the tracks in between tracks 212 and 222 form a cylinder 232 at the inner diameter of the disc pack. All the tracks at the same radial distance as tracks 211 and 221 on all the recording surfaces of the discs 1341, 1342, 1343, 1344 form a cylinder 231 at an intermediate diameter with respect to the disc pack. Finally, all the tracks between tracks 210 and 220 form a third cylinder 230 at the outer diameter of the disc pack. Thus, cylinders are grouping of tracks across two or more recording surfaces. It should be noted that the concept of cylinders is equally applicable to a single disc type disc drive as well as to a multi-disc disc drive. It should also be noted that the number of cylinders will be generally equal to the number of tracks on the surface of the discs in the disc drive. In FIG. 2, the cylinder at the outer diameter is cylinder 0, and the cylinder at the inner diameter is cylinder N, which also carries a reference number 232. It should be noted that generally the tracks are invisible to the naked eye when viewing a disc and that the markings shown in FIGS. 2, 3 and 4 are for the sake of illustration.

FIG. 3 is a schematic representation of one of the discs 1344 of the disc pack shown in FIG. 2. Specifically, recording surface 1364 of disc 1344 is shown in FIG. 3 as are tracks 220, 221 and 222. Disc surface 1364 includes embedded servo information which appear as lines 310, 311, 312, and 313 in FIG. 3. The lines 310, 311, 312 and 313 are actually wedges of servo information used to locate the transducer or one of the transducers 150 in a slider over a selected track on a disc. The servo information 310, 311, 312 and 313 also may include other information such as track ID or track identification portion which is used to identify the track.

FIG. 4 is a schematic representation of a portion of the track 222 shown in FIG. 3. The portion of the track 222 shown in FIG. 4 represents a very small arcuate portion. The arc is so small that, for the sake of simplicity, portions of the track 222 that is shown is shown as though it were along a line. Track 222 includes the servo information 310, 311, 312, 313 as well as several sectors 340, 341, 342, 343, 344 which are used to store information representing data on the track. The servo information 310, 311, 312, 313 is equally spaced along the track portion 222. Sectors are generally 512 bytes long and may be at the beginning or end of a particular piece of servo information or may be split by servo information. For example, sectors 340 and 342 are whole sectors which are not cut or split by servo information. Meanwhile, sector 341 is cut by servo wedge 311, sector 343 is cut by servo wedge 312 and sector 344 is cut by servo wedge 313. The servo portions or wedges 310, 311, 312, 313 each include locational information which is used to center a transducer over the centerline of the track 222. In addition, each bit of servo information includes a track identification field which includes information to identify the track as well as other information about the track. In this particular embodiment, the even servo wedges 310 and 312 store a type of servo information for a read head while the odd servo wedges 311 and 313 store servo information in the track identification field for the write element of the transducer. The track identification fields are shown as reference numerals 410, 411, 412, 413.

Figure 5:
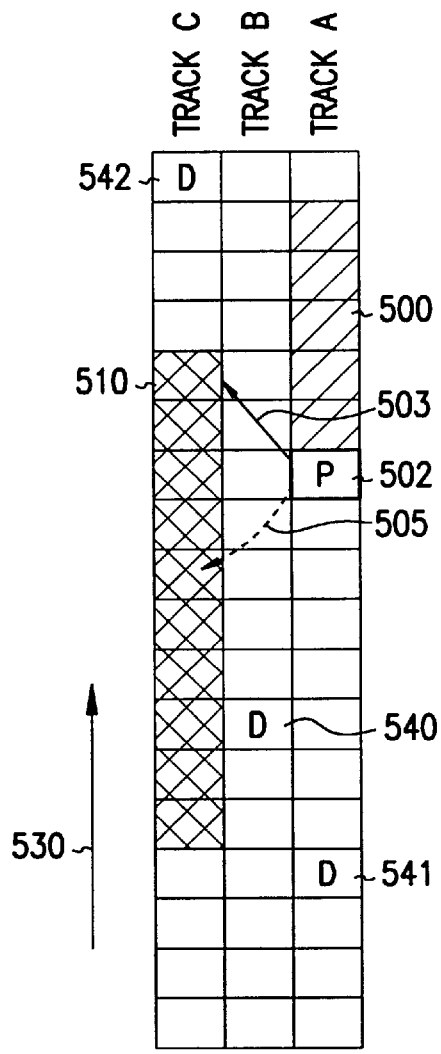
FIG. 5 is a diagram showing a set of tracks from a disc drive on which a first location of crucial information is in track A and a second location of file allocation table information is in track C.

FIG. 5 is a diagram showing a set of tracks A–C, from a disc drive 100 on which a first location of crucial information 500 is in track A and a second location of a file allocation table 510 is in track C. The diagram shown in FIG. 5 is a schematic and, therefore, is not necessarily true to scale but has been greatly simplified in order to more clearly illustrate the nature of the invention. First of all, it should be noted that there are tracks A, B, and C on a disc are generally curved in nature. These tracks are shown as straight rather than as circular tracks. Furthermore, it should also be noted that there are generally many more sectors within a particular track. For example, in FIGS. 5 and 6 there are 18 sectors per track which are depicted as individual boxes within a track or column.

Track A includes a first set of sectors 500 which include crucial information for the operation of the disc drive. The information 500 can be a directory of files that are located on the disc drive 100, or can be a first file allocation table. The file allocation table 510 is used to keep track of clusters of sectors which belong to a particular file. The DOS (disc operating system) uses a file allocation table (FAT) essentially to map the clusters on the disc. When a file is read, DOS automatically and invisibly checks the FAT to find all the clusters of the file. When writing to the disk, DOS checks the FAT for available clusters. FAT-based file systems simply number all of the clusters in a manner similar to the way disc drive numbers logical blocks. The operating system keeps track of which cluster number and in what order the clusters have been assigned to a given file. Operating systems store most of the cluster data in the FAT. Typically, when the operating system reads a file, it first checks the directory which may correspond to the first set of crucial data 500. And the operating system also checks the FAT for the entry with the number corresponding to the first cluster number. This FAT entry indicates the number of the next cluster in the file. After reading that cluster, the operating system checks the entry corresponding to that cluster to find the next entry for the next cluster. If the file has no additional clusters, the cluster entry has a value of zero FF (hex). The operating system assigns unused clusters which are generally available for adding to files to store data. When an operating system such as DOS erases a file, it merely changes the first character of the file name in the directory entry to OE5 (hex) and changes all the FAT entry values of the file to zero. It should be noted that when reading a file, the directory, which may be represented by the first set of crucial data 500, must be looked at for each cluster of sectors within the file. Essentially, when reading data, first a directory or first set of crucial information 500 is checked. There is a pointer 502 at the end of the first set of crucial information. The pointer points to the logical block addresses associated with the file allocation table or FAT 510. An arrow 530 placed alongside the track C indicates the direction of rotation of the disc, not shown with respect to the head, shown as element 150 in FIG. 1. When seeking from track A to track C, the sectors will travel in the direction shown by arrow 530. FIG. 5 shows a problem that occurs when the file allocation table 510 is radially positioned so that the pointer 502 is behind the start of or beginning of the file allocation table 510. 503 shows the actual electronic pointer while 505 shows the result of a seek from the pointer 502 to the file allocation table in track C. As can be seen in FIG. 5, the result of seeking from the pointer to the file allocation table 510 places the transducer head 150 in the middle of the file allocation table 510. The file allocation must be read from the beginning in order to assure that the first available information in the file allocation table is read initially. As a result, in order to correctly read the file allocation table the disc must be rotated a full revolution before the beginning of the file allocation table 510 can be read. This is referred to as the directory or first file allocation table 500 being "out of alignment" with the file allocation table 510. The results of this "out of alignment" condition is that during a read operation, extra revolution of the disc drive must be made before the file allocation table 510 can be read. Also, while updating the first crucial information, the second or file allocation table 510 must also be updated. The result is that the first set of crucial information such as the directory is updated, then the pointer points to the first position in the file allocation table. When the FAT 510 is "out of alignment" with the first crucial information, another extra revolution will have to be made before the first portion of file allocation table can be accessed and rewritten. The end result is either during a read or a write, an extra revolution of the disc drive will have to be made in each case. The result is that the disc drive access times become greater which is a lessening in the performance of the disc drive.

It should also be noted that there are several defective sectors 540, 541 and 542 which are located between the end of the first crucial information 500 and the start of the FAT 510. Generally, information stored on the sectors between the end of the first crucial information and the beginning of the FAT will be slipped. In other words, the three defective sectors 540, 541, 542 are skipped over and the next logical block address is written to the first available sector after the defect. In this case, three defects are skipped and, therefore, the FAT is shifted or slipped three sectors down track C. Also note the position of the defective sectors 540, 541, 542 is also kept in memory. Defective sectors, of course, are sectors which cannot be reliably written to so that data in the defective sectors can be recovered.

In FIG. 5, the first set of crucial information is in a location 500. The location has a beginning sector and an end sector including pointer 502. The FAT 510 occupies a second position. The actual second position is determined, in part, by the number of defective sectors 540, 541 and 542 which must be skipped. In other words, skipping three defective sectors will slip the information stored in the FAT three sectors down C.

Figure 6:
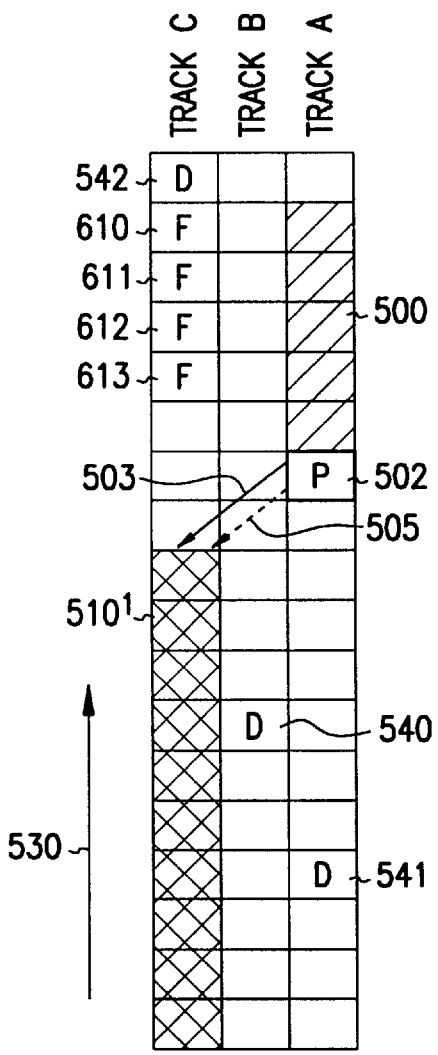
FIG. 6 is a diagram showing a set of tracks from a disc drive on which a first location of crucial information is in track A and a second location of file allocation table information is in a shifted or adjusted position on track C.

FIG. 6 is a diagram showing a set of tracks A through C from the disk drive in which a first location of crucial information 500 is in track A and a second adjusted location of the file allocation table or FAT 510 is in an adjustable position on track C. Again, the first crucial information 500 occupies the essentially the same position as it did in FIG. 5. The first crucial information 500 includes a pointer 502 depicted by a sector having a P therein. The pointer 502 points to the beginning of the file allocation table 5101, shown in FIG. 6. The file allocation table 5101 has essentially the same length as the file allocation table 510. Defective sectors 541, 540 and 542 also occupy the same position as shown in FIG. 5. The difference between FIGS. 5 and 6 is that several fake defective sectors have been designated and inserted prior to the beginning of the FAT 5101. In this particular example, four pseudo or fake defective sectors 610, 611, 612 and 613 have been inserted to shift the position of FAT 510 to its position 5101. The number of pseudo or fake defective sectors 610, 611, 612 and 613 is selected so that when pointer 502 points to the beginning of the file allocation table, a seek 505 can be done from track A to track C so that the head 150 (shown in FIG. 1) arrives at the beginning of the file allocation table 5101 at the end of the seek.

In other words, a number of fake defective sectors 610–613 are placed between the end of the first crucial information and the beginning of the file allocation table 5101. The number of defective sectors is selected so that it shifts the FAT table 5101 radially down track C to a point where a seek from the end of the first crucial information 500 to the track C where the file allocation table 5101 is stored can be accomplished so that the head 150 is at the beginning of the file allocation table 5101. By placing the additional fake sectors 610–613 before the beginning of the file allocation table 5101, the radial position of the beginning of the allocation table 5101 is shifted so that a seek may be performed from track A to track C before the beginning of the file allocation table 5101 is encountered. This provides a performance advantage for the disc drive. Since the seek to track C can be accomplished before the beginning of the file allocation table 5101, there is no need to wait for an additional revolution to read the file allocation table or to update the file allocation table 5101. The performance advantage is not minimal since the first set of crucial information 500 must be accessed and the second FAT table 5101 must be accessed for each read or for each update that is performed within the disc drive. Since there are a number of reads or writes to the disc drive, this actually provides a significant performance advantage for the disc drive in that extra revolutions will not have to be made in order to read the file allocation table 5101.

Figure 7:
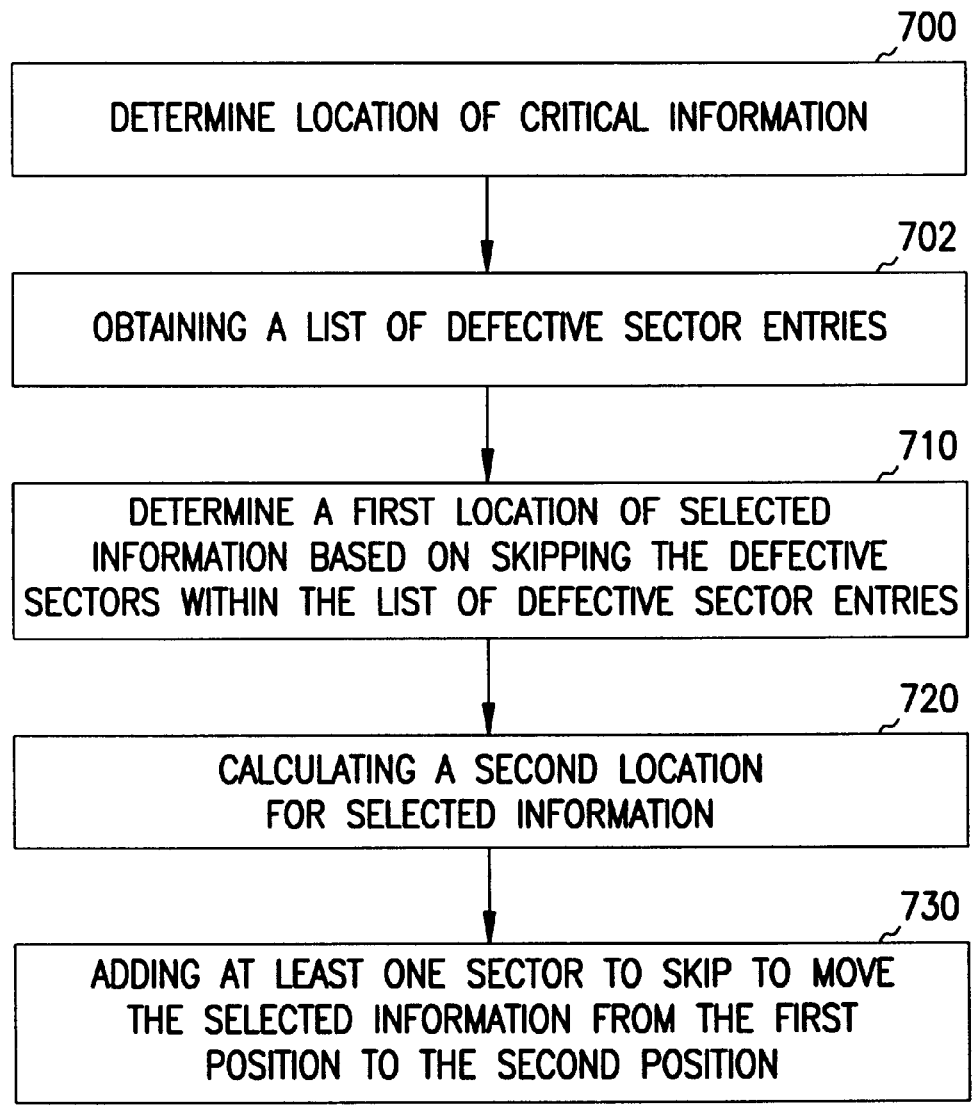
FIG. 7 is a flow chart for implementing the method of this invention.

FIG. 7 is a flow chart showing the methodology of this invention. Initially, the location of the first sectors of crucial information 500 as well as the pointer 502 are determined, as depicted by reference numeral 700. A list of the defective sector entries is obtained, as depicted by reference numeral 702. Next, a first location of selected information based on skipping the defective sectors within the list of defective sectors is determined 710. This, essentially, is the position of the beginning of the FAT file 510, as accounted for or as slipped by the defective sectors 540, 541 and 542. Next, a second location is calculated for the selected information or for the FAT file 510. In other words, given the speed at which the disc 134 is rotating as well as the time necessary for an access from the pointer 502 to track C, it can be determined where the beginning of the FAT file 510 must be positioned so that the file access can be accomplished from the pointer 502 to track C before the first portion of the FAT file 510 is encountered. The next step is to add at least one sector for skipping to move the selected information from the first position, as shown in FIG. 5, to the second position, as shown in FIG. 6. In other words, the fake or pseudo sectors 610, 611, 612, 613 are inserted so that the FAT file 5101 is slipped to a position where an access can be accomplished from track A to track C before the beginning of the FAT file 5101 is encountered.

Advantageously, the disc drive which uses the above inventions reduces the access times caused by offsets from slipped sectors in the directory and the file allocation table on the disc drive. The invention also provides for quick, reliable access to both the directory and the file allocation table during the execution of read commands. This prevents performance degradation since the access time is kept to a minimum. Using the invention, the access time to LBAs in the directory or the file allocation table is kept to a minimum since the estimated PCHS for the LBAs in these two critical areas are offset very little, if any, from the estimated PCHS. The invention is also flexible enough to handle different requirements from different operating systems used.

Figure 8:
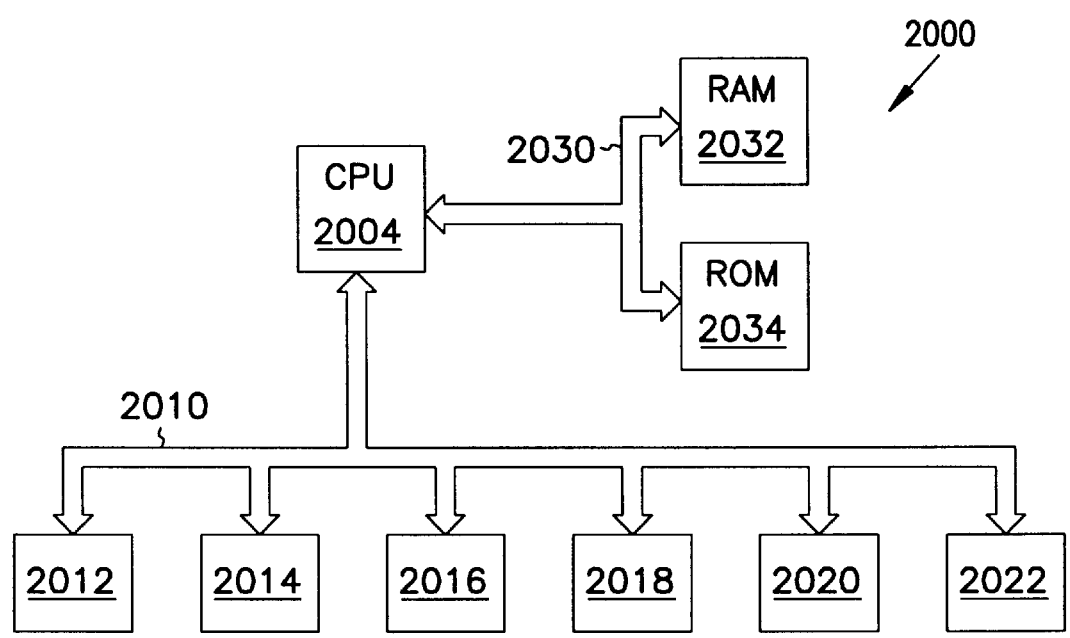
FIG. 8 is a schematic view of a computer system.

FIG. 8 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a method for formatting a plurality of sectors to a storage surface 1351 on a disc 134 in a disc drive 100 includes reading information from a first location 500 for storage of a first logical block address on a disc to determine a second location 5101 on the disc and determining a second physical location, spaced from the first location. The method also includes formatting the disc surface by providing a selected number of fake defective sectors 610, 611, 612, 613 before the second physical location 5101. This causes the radial position of the second physical location 5101 to slip with respect to the first location 500. Slipping the radial position of the second physical location 5101 helps during a seek. The second location 5101 is slipped just enough so that during a seek from the first physical location 500 to the second physical location 5101, a transducer 150 for reading or writing to the second location 5101 arrives just in time to read or write to the second location 5101. The first location 500 is a first physical sector on a disc and the second location is a second physical location on a disc. A first logical block address resides in the first physical location and a second logical block address resides in the second physical location. Reading includes reading a directory of files on a disc drive 100. Reading may also include reading a first file access table 500 from the disc drive 100 and updating a second file access table 5101 from the disc drive. Determining includes reading from or writing to a file access table on a disc drive.

A method of formatting a disc drive 100 includes obtaining a list of defective sector entries, determining a first location of selected information 500 based on skipping the defective sectors 540 within the list of defective sector entries, calculating a second location for selected information 5101, and adding at least one sector 610 to skip to move the selected information from the first position 710 to the second position 720. Adding may further include designating sectors 610, 611, 612, 613 that can be written to and read from as defective sectors. In other words, adding at least one sector 610 to skip to move the selected information from the first position to the second position includes designating good sectors as defective sectors. The good sector designated as a defective sector 610 is added to the listing of defective sectors. Calculation of the second location 5101 includes equating the second location for the selected information to a target position for a seek operation, and selecting a start position for the seek operation. The start position for the seek operation is typically from a sector 502 on the disc which stores critical information, such as from a sector on the disc which stores a directory of files located on a disc drive or from a file allocation table 500. The start position for the seek operation is selected from a sector on the disc having information used by the operating system of a computer 502. Information used by the operating system of the computer is also stored at the target position. The calculating step further includes equating the second location 5101 for the selected information to a target position for a seek operation, and selecting a start position for the seek operation. The first location 500 is a first file allocation table and the second location 5101 being a second file allocation table. The first location 500 may also be a directory of files stored on the disc drive and the second location 5101 may be a file allocation table.

Most generally, a disc drive 100 for storing information on the disc drive includes a first location 500 for storing information and a second location 5101 for storing information and a device for adjusting the position of one of the first location 500 for storing information or the second location 5101 for storing information.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method comprising the steps of:
   (a) reading information from a first location on a storage medium to determine a second location on the storage medium;
   (b) determining a second physical location, spaced from the first location; and
   (c) formatting the storage medium by providing a selected number of fake defective sectors before the second physical location causing the radial position of the second physical location to slip with respect to the first location so that during a seek from the first physical location to the second physical location, a transducer for reading or writing to the second location arrives just in time to read or write to the second location.

2. The method of claim 1 wherein the first location is a first physical sector on a disc and the second location is a second physical location on a disc.

3. The method of claim 1 wherein a first logical block address resides in the first physical location and wherein a second logical block address resides in the second physical location.

4. The method of claim 1 wherein the reading step (a) further comprises (a)(i) reading a directory of files on a disc drive.

5. The method of claim 4 wherein the determining step (b) further comprises (b)(i) reading from or writing to a file access table on a disc drive.

6. The method of claim 1 wherein the reading step (a) further comprises (a)(i) reading a first file access table on a disc drive.

7. The method of claim 1 further comprising the step of (d) updating a second file access table on a disc drive.

8. A method comprising the steps of:
   (a) obtaining a list of defective storage location entries;
   (b) determining a first location of selected information based on skipping at least one defective storage location within the list of defective storage location entries;
   (c) calculating a second location for the selected information; and
   (d) adding at least one storage location to skip to move the selected information from the first location to the second location.

9. The method of claim 8 wherein the adding step (d) further comprises the step of (d)(i) designating sectors that can be written to and read from as defective sectors.

10. The method of claim 8 wherein the adding step (d) further comprises the step of (d)(i) designating good sectors as defective sectors.

11. The method of claim 8 wherein the adding step (d) further comprises the steps of:
   (d)(i) designating a good sector as a defective sectors; and
   (d)(ii) adding the designated sector to the list of defective storage location entries.

12. The method of claim 8 wherein the calculating step (c) further comprises the steps of:
   (c)(i) equating the second location for the selected information to a target position for a seek operation; and
   (c)(ii) selecting a start position for the seek operation.

13. The method of claim 12 wherein the selecting step (c)(ii) further comprises selecting a start position for the seek operation from a sector on the disc which stores critical information.

14. The method of claim 12 wherein the selecting step (c)(ii) further comprises the step of selecting a start position for the seek operation from a sector on a disc which stores critical information such as a directory of files located on a disc drive.

15. The method of claim 12 wherein the selecting step (c)(ii) further comprises the step of selecting a start position for the seek operation from a sector on a disc which stores critical information such as a file allocation table.

16. The method of claim 12 wherein the selecting step (c)(ii) further comprises the step of selecting a start position for the seek operation from a sector on a disc, wherein information used by the operating system of a computer is stored at the start position and at the target position.

17. The method of claim 8 wherein the calculating step (c) further comprises the steps of:
   (c)(i) equating the second location for the selected information to a target position for a seek operation, the second location being a second file allocation table; and
   (c)(ii) selecting a start position for the seek operation as a first file allocation table.

18. The method of claim 8 wherein the calculating step (c) further comprises the steps of:
   (c)(i) equating the second location for the selected information to a target position for a seek operation, the second location being a file allocation table; and
   (c)(ii) selecting a start position for the seek operation as a directory of files stored on a disc drive.

19. A disc drive for storing information on the disc drive comprising:
   a first location for storing information;
   a second location for storing information; and
   means for adjusting the position of one of the first location for storing information or the second location for storing information.

* * * * *

UNITED STATES PATENT AND TRADEMARK OFFICE
CERTIFICATE OF CORRECTION

PATENT NO.     : 6,747,825 B1
DATED          : June 8, 2004
INVENTOR(S)    : Wei Loon Ng et al.

It is certified that error appears in the above-identified patent and that said Letters Patent is hereby corrected as shown below:

Title page,
Item [73], Assignee, replace "JPMorgan Chase Bank, as Collateral Agent, New York, NY (US)" with -- Seagate Technology LLC, Scotts Valley, CA (US) --.

Signed and Sealed this

Fifth Day of October, 2004

JON W. DUDAS
*Director of the United States Patent and Trademark Office*